United States Patent
Reetz et al.

(10) Patent No.: US 11,572,606 B2
(45) Date of Patent: Feb. 7, 2023

(54) HIGH-TENSILE BRASS ALLOY AND HIGH-TENSILE BRASS ALLOY PRODUCT

(71) Applicant: Otto Fuchs Kommanditgesellschaft, Meinzerhagen (DE)

(72) Inventors: Björn Reetz, Krefeld (DE); Hermann Gummert, Burscheid (DE); Thomas Plett, Schmallenberg (DE)

(73) Assignee: OTTO FUCHS KOMMANDITGESELLSCHAFT, Meinzerhagen (DE)

( * ) Notice: Subject to any disclaimer, the term of this patent is extended or adjusted under 35 U.S.C. 154(b) by 0 days.

(21) Appl. No.: 17/275,143

(22) PCT Filed: Oct. 29, 2018

(86) PCT No.: PCT/EP2018/079587
§ 371 (c)(1),
(2) Date: Mar. 10, 2021

(87) PCT Pub. No.: WO2020/088738
PCT Pub. Date: May 7, 2020

(65) Prior Publication Data
US 2021/0355562 A1    Nov. 18, 2021

(51) Int. Cl.
*C22C 9/04*    (2006.01)
*F16C 33/12*    (2006.01)

(52) U.S. Cl.
CPC .............. *C22C 9/04* (2013.01); *F16C 33/121* (2013.01); *F16C 2204/14* (2013.01)

(58) Field of Classification Search
CPC ...... C22C 9/04; F16C 33/121; F16C 2204/14; C22F 1/08
See application file for complete search history.

(56) References Cited

U.S. PATENT DOCUMENTS

| | | | |
|---|---|---|---|
| 10,316,398 B2 * | 6/2019 | Plett | ...................... F16C 33/121 |
| 10,570,484 B2 | 2/2020 | Plett et al. | |
| 2014/0259674 A1 * | 9/2014 | Zhu | ........................... C22F 1/08 420/471 |
| 2016/0348215 A1 | 12/2016 | Gummert et al. | |
| 2017/0145549 A1 * | 5/2017 | Plett | ........................ C22F 1/08 |
| 2019/0093195 A1 | 3/2019 | Gummert et al. | |

(Continued)

FOREIGN PATENT DOCUMENTS

| CH | 223580 A | 9/1942 |
|---|---|---|
| CN | 101287848 A | 10/2008 |

(Continued)

OTHER PUBLICATIONS

International Search Report dated May 7, 2020 in parent international application PCT/EP2018/079587.

(Continued)

*Primary Examiner* — John A Hevey
(74) *Attorney, Agent, or Firm* — Polson Intellectual Property Law, PC; Margaret Polson; Christopher Sylvain

(57) ABSTRACT

A special brass alloy containing 62.5 to 65% by weight Cu, 2.0 to 2.4% by weight Mn, 0.7 to 0.9% by weight Ni, 1.9 to 2.3% by weight Al, 0.35 to 0.65% by weight Si, 0.3 to 0.6% by weight Fe, 0.18 to 0.4% by weight Sn and Cr, either alone or in combination, ≤0.1% by weight Pb, the remainder consisting of Zn and inevitable impurities.

11 Claims, 7 Drawing Sheets

(56) References Cited

U.S. PATENT DOCUMENTS

2020/0024694 A1    1/2020    Gummert et al.
2020/0370147 A1    11/2020    Plett et al.

FOREIGN PATENT DOCUMENTS

| | | | |
|---|---|---|---|
| CN | 101705388 | A | 5/2010 |
| CN | 106460096 | A | 2/2017 |
| DE | 59949 | C | 4/1891 |
| DE | 1558467 | A1 | 7/1970 |
| DE | 1558817 | B2 | 2/1975 |
| DE | 3805794 | A1 | 9/1988 |
| DE | 202017103901 | U1 | 7/2017 |
| EP | 0407596 | B1 | 1/1995 |
| EP | 3118338 | A1 | 1/2017 |
| EP | 3269835 | B1 | 8/2018 |
| FR | 2506334 | A1 | 11/1982 |
| JP | 2001355029 | A | 12/2001 |
| KR | 20170029161 | A | 3/2017 |
| KR | 10-2018-0083964 | | 7/2018 |
| RU | 2415188 | C2 | 3/2011 |
| RU | 2660552 | C2 | 7/2018 |
| WO | 2010122960 | A1 | 10/2010 |
| WO | 2018033360 | A1 | 2/2018 |

OTHER PUBLICATIONS

Written Opinion of the International Searching Authority dated May 7, 2020 in parent international application PCT/EP2018/079587.

Weber, K et al, "Neuer Pb-freier Kupferwerkstoff fuer Gleitlageranwendungen in Verbrennungsmotoren und Getrieben", Metall: Fachzeitschrift Für Metallurgie; Technik, Wissenschaft, Wirtsc, Gdmb-Verag, Clausthal-Zellerfeld, DE, vol. 63, No. 11, pp. 564-567 (Nov. 1, 2009), XP009157102, ISSN: 0026-0746 [English translation of abstract appears on last page].

Examination Report dated Oct. 21, 2021 in related Russian application 2021105171.

Examination Report dated Jan. 6, 2022 in related Chinese application 201880098633.7.

Xing Yan et al., "National Heavy Equipment Publishing Engineering Space Materials", pp. 143-144 (May 31, 2018) [The PDF text was too degraded to generate a machine translation. Per MPEP 609.04(a)(III), a concise explanation of relevance is provided by the "A" indication and discussion of this reference in the Chinese Examination Report.]

Examination Report dated Jul. 29, 2021 in related Korean application 10-2021-7015406.

Office Action dated Nov. 23, 2021 in related Korean application 10-2021-7015406.

Examination Report dated Sep. 7, 2022 in related Indian application 202127020331.

Examination Report dated Aug. 1, 2022 in related Brazilian application BR112021006583-0.

Examination Report dated Jun. 22, 2022 in related Chinese application 201880098633.7.

Examination Report dated Oct. 18, 2022 in related Chinese application 201880098633.7.

\* cited by examiner

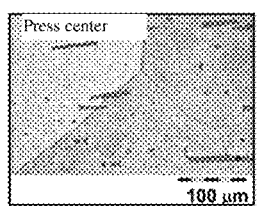
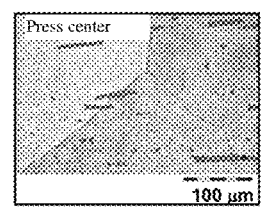
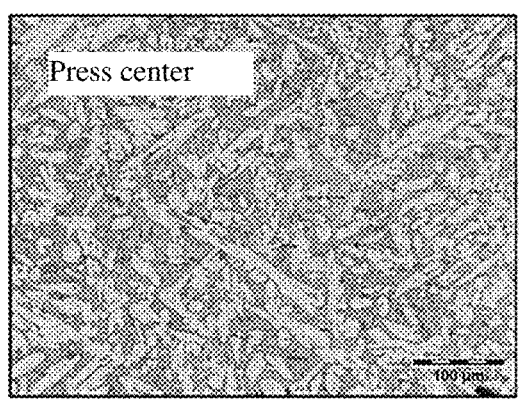
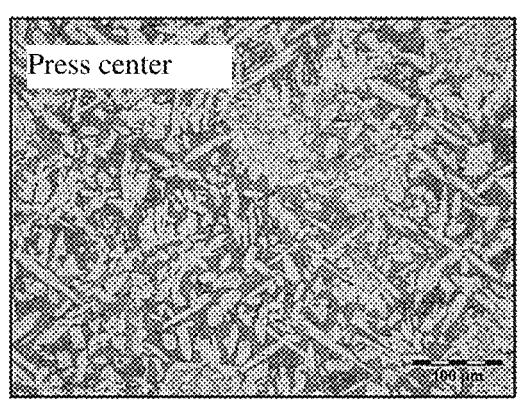
Fig. 3                    Fig. 4

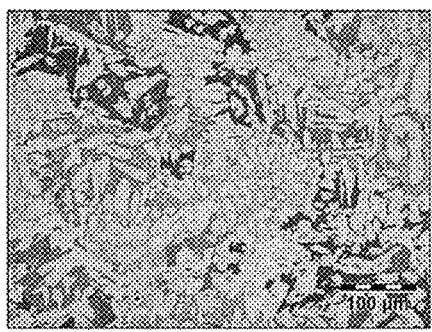
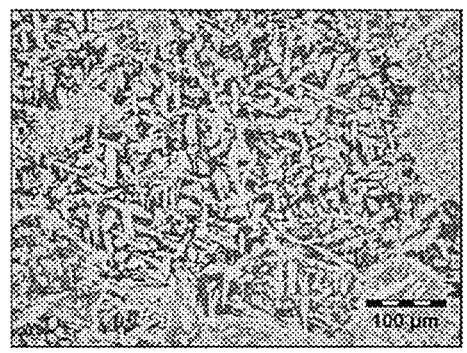
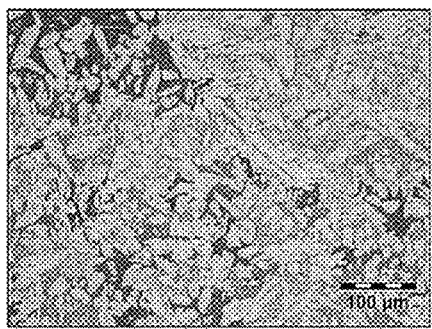
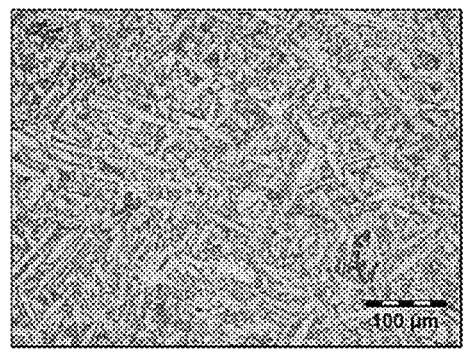
Fig. 5    Fig. 6

HIGH-TENSILE BRASS ALLOY AND HIGH-TENSILE BRASS ALLOY PRODUCT

BACKGROUND

The present disclosure relates to a special brass alloy and to a product produced from this special brass alloy.

For typical friction applications in a lubricant environment, generally low friction coefficients of the alloy used are required, wherein, in addition, the friction coefficient should be adaptable within predetermined limits to the respective application, in particular to the friction partner, the lubricant used and the friction conditions such as contact pressure and relative speed. This applies particularly to piston bushings which are exposed to high static and dynamic loads. Moreover, applications with high relative speeds of the friction partners, for example, in the case of axial bearings of a turbocharger, require alloys which ensure, in addition to reduced heat development, also good heat dissipation from the friction surface.

Due to the friction power and the oil contact, a tribological layer with accumulated lubricant components forms on the bearing surface. In the process, an even and at the same time high accumulation rate of the lubricant components and their degradation products is required in order to maintain a sufficiently stable absorption layer on the sliding layer.

Furthermore, a suitable bearing material is additionally characterized by a broad oil compatibility, so that the buildup of the tribological layer is largely not sensitive to the choice of certain oil additives. An additional aim consists in specifying an alloy for friction applications with good dry running properties so that a sufficient service life under dry friction conditions can be ensured.

For friction-stressed components, it is additionally important that the alloy used has sufficient strength. Accordingly, a high 0.2% elasticity limit should exist, in order to keep the plastic deformations occurring under load as small as possible. Additionally, it is necessary to specify a particularly hard alloy with a high tensile strength in order to increase its resistance to abrasive and adhesive stresses. In addition, a sufficient toughness is required as protection against impact stresses. In this connection, it is necessary to reduce the number of microdefects and the resulting growth of defects. This is associated with the requirement to specify an alloy with the highest possible fracture toughness which is largely free of internal stresses.

Suitable alloys for friction-exposed components are commonly special brasses comprising, in addition to copper and zinc as main components, an alloy additive consisting of at least one of the elements nickel, iron, manganese, aluminum, silicon, titanium or chromium. Here, in particular silicon brasses satisfy the aforementioned requirements, wherein CuZn31Si1 represents a standard alloy for friction applications such as for piston bushings. Furthermore, it is known to use tin bronzes which, in addition to tin and copper, additionally comprise nickel, zinc, iron and manganese, for friction applications or for mining.

As an example of a copper-zinc alloy which is suitable for machine parts exposed to sliding, such as bearings, worm gears, gear wheels, sliding shoes and the like, reference is made to CH 223 580 A. Disclosed is a copper proportion of 50-70% by weight with an alloy additive of 2-8% by weight aluminum, 0.05-3% silicon and 0.5-10% by weight manganese, the remainder being zinc. In addition, the alloy can comprise up to a maximum of 10% by weight lead as well as 0.1-5% by weight of one or more elements from the group consisting of iron, nickel and cobalt. Moreover, from EP 0 407 596 B1, a special brass alloy is known which comprises, in addition to copper, zinc, manganese, aluminum and silicon, comprises iron, nickel and cobalt as optional alloy components. In addition, a proportion of 0.03-1% by weight oxygen is provided. Moreover, DE 15 58 467 A discloses another special brass alloy which is provided for objects exposed to sliding and friction. In addition to copper and a zinc proportion which can reach up to 45 wt %, there is an alloy additive of manganese and silicon as well as tellurium. In addition, Fe, Ni, Al and Be represent additional optional alloy components. Furthermore, DE 15 58 817 B2 and DE 59 949 C1 describe copper alloys with a broad composition, which form a bearing material with reduced wear.

In order to achieve certain properties of a product produced from a special brass alloy, alloys with different alloy elements are used. For such components, it is thus necessary accordingly to keep different products in stock and especially also to master the handling of this wide variety of alloys.

JP 2001-355029 A discloses a synchronizer ring and thus a component designed for a temporally variable frictional load. This component is produced by the following steps: casting of a blank, hot extrusion molding of a tube, excision of a ring, hot forging and subsequent machining. The synchronizer ring is produced from a special brass alloy containing 62.46% Cu, 30.8% Cn and 0.053% Cr, the remainder consisting of Zn.

Weber et al.: "Neuer Pb-freier Kupferwerkstoff für Gleitlageranwendungen in Verbrennungsmotoren and Getrieben [New Pb-free Copper Material for Slide Bearing Applications in Combustion Engines and Transmissions]," Metall: Fachzeitschrift für Metallurgie; Technik, Wissenschaft, Wirtschaft, GDMB-Verlag, Volume 63, No. 11, pages 564-567 (Nov. 1, 2009), discloses a slide bearing made of a special brass alloy with the following composition: 58% Cu, 0.5% Pb, 1% Si, 2% Mn, 0.5% Ni, 0.5% Fe, 2% Al, the remainder consisting of Zn.

An additional special brass alloy which is characterized by high strengths, improved abrasion resistance under frictional load and good dry running properties in case of deficient lubrication is known from EP 3 269 835 B1. This special brass alloy is an alloy with 60 to 62% by weight Cu, 2.1 to 2.5% by weight Mn, 0.2 to 0.6% by weight Ni, 2.9 to 3.1% by weight Al, 0.35 to 0.65% by weight Si, ≤0.1% by weight Fe, ≤0.1% by weight Sn, ≤0.1% by weight Pb, the remainder consisting of Zn and inevitable impurities. The products produced from this special brass alloy are characterized by elongate intermetallic phases in the structure which give the alloy products a high mechanical abrasion resistance. In extrusion molding, these intermetallic phases tend to result in a good longitudinal alignment tendency. Here, the elongate formation of the intermetallic phases of primarily the Mn-silicides, has the function of protecting the matrix against wear-generating stress. Thus the grain size of the (3 phase or of the 3-phase-dominated matrix is between 100 and 300 µm. Here, the products produced from this alloy are relatively coarse grained, which, however, can be advantageous for chip breaking in a metal cutting process applied to a semi-finished product produced from this alloy.

Although this previously known alloy has positive properties, the resulting relatively coarse grain is also sometimes considered to be disadvantageous, since grain boundary cracks can form during cold forming. Although semi-finished products produced from this alloy can be easily mechanically processed, it would be desirable for the remaining surface roughness resulting from mechanical processing, in particular from a metal cutting process, to be lower in order to avoid further processing effort due to subsequent polishing or a similar surface processing when the special brass alloy product is supposed to have only a low surface roughness. In addition, it has been found that these special brass alloy products or semi-finished products are subjected to relatively great thermal relaxation. As a result, the process windows to be complied with under certain circumstances, for example, for a thermal relaxation, have to be kept very narrow. In addition, when products are subjected to higher temperatures and in particular also to greater temperature variations, this process of thermal relaxation of this alloy can lead to a reduction in strength.

SUMMARY

Proceeding from this background, an aspect of the present disclosure is to propose a special brass alloy, as well as a special brass alloy product produced from this alloy, which in terms of type is similar to the alloy previously disclosed in EP 3 269 835 B1, but which is improved with regard to the grain size and the thermal relaxation behavior.

This is achieved by a special brass alloy with
62.5 to 65% by weight Cu,
2.0 to 2.4% by weight Mn,
0.7 to 0.9% by weight Ni,
1.9 to 2.3% by weight Al,
0.35 to 0.65% by weight Si,
0.3 to 0.6% by weight Fe,
0.18 to 0.4% by weight Sn and Cr, either alone or in combination,
≤0.1% by weight Pb,
the remainder consisting of Zn and inevitable impurities.

This special brass alloy is characterized by a very homogeneous and fine-grained microstructure which is already formed in the first initially shaped semi-finished product—a cast preform or an extrusion molded preform. The average grain size is 40 to 150 μm. The casting of the alloy leads to an even finer grain size. A special characteristic moreover is that already in this semi-finished product, this special brass alloy has an α-β structure, wherein the α-phase is enclosed lattice-like or strip-like in the β phase or penetrates said phase. The particles of the α-phase in this manner connect the grains of the β-matrix, with the result that the grain network remains intensively interpenetrated by the α-phase and therefore remains preserved even in case of cold forming stresses. In this alloy, it is interesting that this structure forms even in an extrusion molded preform without preferential direction, and therefore the same or nearly the same structure can be observed in longitudinal as well as in transverse direction of the pressed connecting piece. Consequently, the grain boundaries in the structure of a special brass alloy product produced from this special brass alloy, which can certainly be a semi-finished product, do not represent weak points, in contrast to the alloy previously disclosed in EP 3 269 835 B1, whose structure with a proportion of α-phase of typically clearly less than 10% comprises a β-phase which predominates by far and in which the α-phase is at most arranged in the region of the grain boundaries or within the β phase. This is why this new alloy is not susceptible to grain boundary cracking during cold forming. In addition, when such special brass products are used at high temperatures or under the influence of temperature variations, reductions in strength are avoided or considerably reduced in comparison to the aforementioned alloy, and indeed along with the achieved fine grain size.

It was surprising to note that such significant differences in the structure and thus the advantages achieved with this alloy can be implemented by means of a relatively small change in the alloy composition in comparison to the one known from EP 3 269 835 B1. It was not foreseeable that a small change of the zinc equivalent of this special brass alloy in comparison to the one known from EP 3 269 835 B1 in order to achieve slightly more α-phase would result in such significant changes in the special brass alloy product. Thus, it is the interaction, unexpected as result, of the elements participating in the construction of the alloy, already during the initial forming—casting or extrusion molding—, that leads to the positive properties of the special brass alloy or of the product or semi-finished product produced therefrom. This also includes a low thermal relaxation, so that correspondingly large process windows can be allocated for thermal relaxation.

In this special brass alloy, as already specified, it is noteworthy that, when this special brass alloy is extrusion molded for producing a semi-finished product, no structural differences between the core and the marginal zone of the pressed product can be detected. Interestingly, the α-phase penetrating the β-phase in a lattice-like manner, both in longitudinal extension or in transverse extension of the pressed product, is formed no differently, in any case not significantly differently, with regard to its longitudinal axis orientation, so that the α-phase penetrating the β-phase has no preferential direction in the pressed products. Therefore, such a preform can be processed without having to take into consideration a preferred structural extension. A section of an extrusion molded connecting piece, intended, for example, for forging, can thus be formed independently of the extrusion molding direction. Furthermore, it is particularly advantageous that the intermetallic compounds—the silicides—embedded in the α-β matrix, in contrast to the elongate habit of the special brass alloy known from EP 3 269 835 B1, have a rather round, globular habit which is at most only slightly elongate, and therefore they also have no preferential direction, at most only a slight stretching. And, as a result, they also do not break during forming.

The elements Sn and Cr which influence the grain refinement participate, alone or in combination, in the amount of 0.18 to 0.4% by weight in the alloy. According to an embodiment example, it is provided that the alloy contains only Sn and no Cr. The Sn proportion is preferably 0.2 to 0.3% by weight. In another design, the alloy contains no Sn, but contains Cr in the amount of preferably 0.2 to 0.27% by weight. An amount of these elements exceeding 0.4% by weight does not lead to significant improvements. Besides Sn and Cr, the Fe content also contributes to the grain refinement. When Sn is used, it also has positive properties with regard to the formation of a passivation layer on the surface of the special brass alloy product produced from the alloy, so that its tribological properties are improved.

The semi-finished products produced from this special brass alloy are characterized by a good cold formability. Thus, from this special brass alloy, it is also possible to produce products such as, for example, sliding shoes, the production of which requires a considerable forming rate. In the case of sliding shoes, for example, it is necessary to be able to flange the semi-finished product after the forging in order to form a flange. In spite of this good cold formability, this material is sufficiently hard so that it satisfies the requirements for such a sliding shoe during use, in particular the desired stability time.

The thermal relaxation resistance is achieved by a fine-grained structure and the α-β matrix already described above. In this regard, another positive effect that can be seen is that the grains of the matrix do not undergo adjustment and thus have no preferential direction.

In this alloy, it is also noteworthy that its electrical conductivity is reduced by approximately 10% with respect to the alloy known from EP 3 269 835 B1. Correspondingly lower corrosion currents can flow, so that the corrosion resistance is also improved in this manner.

The proportion of the α-phase in a cast preform or an extrusion molded preform is approximately 40 to 60%. That such a proportion of α-phase in the cast preform or in the extrusion molded preform is present is unexpected, since, in the comparison alloy according to EP 3 269 835 B1, the proportion of α-phase in this alloy state is only at most 10%, but is typically clearly less than 10%. The approximately equal proportion of α-phase and β-phase within the aforementioned limits represents a good starting point for being able to reduce or increase, as a function of the desired structure composition in the end product, the proportion of α-phase by heat treatment processes such as annealing, for example. By heat treatment of the alloy product at low temperature, typically in the range between 270° C. and 290° C. for 4.5 h to 6 h, the proportion of α-phase can be clearly reduced, and namely to 20% to 25% with these heat treatment parameters. A heat treatment at higher temperature, for example, between 435° C. and 460° C. for approximately 2.5 h to 3.5 h leads to an increase of the proportion of α-phase. In this manner, special brass alloy products which have a proportion of α-phase of 70 to 75% can be produced. To that extent, the proportion of α-phase which is actually desired in the end product can be adjusted individually and independently of the initial forming.

These positive abrasion-resistant properties of a product produced from this alloy are already reflected in the hardness. After the extrusion molding, the semi-finished product has a hardness between 135 and 145 HB [2.5/62.5]. By means of a heat treatment after the forming, the hardness can be increased to values of more than 160 HB if the workpiece is heat treated at the above-described higher temperatures and for the shorter treatment duration.

This special brass alloy preferably contains 63 to 64% by weight Cu, 2.1 to 2.2% by weight Mn, 2.0 to 2.2% by weight Al and 0.4 to 0.5% by weight Fe.

BRIEF DESCRIPTION OF THE DRAWINGS

The below descriptions are provided using embodiment examples in reference to the appended figures, wherein:

FIG. 3 shows detail views of the polished longitudinal section of the first special brass alloy juxtaposed with a comparison sample, FIG. 4 shows detail views of the polished longitudinal section of the second special brass alloy juxtaposed with a comparison sample, FIG. 5 shows a photomicrograph of a sliding shoe produced from the first special brass alloy, FIG. 6 shows a photomicrograph of a lathed bushing produced from the first special brass alloy.

DETAILED DESCRIPTION

From two special brass alloys according to the present disclosure and a comparison alloy, samples were prepared and subsequently extrusion molded at approximately 700° C. The composition of sample V of the comparison alloy and that of the two samples E1, E2 made of the special brass alloys according to the present disclosure are reproduced below (specifications in % by weight):

|    | V         | E1        | E2        |
|----|-----------|-----------|-----------|
| Cu | 61        | 63.5      | 63.7      |
| Mn | 2.3       | 2.2       | 2.0       |
| Ni | 0.4       | 0.73      | 0.73      |
| Al | 3.0       | 2.2       | 2.1       |
| Si | 0.6       | 0.6       | 0.49      |
| Fe | 0.05      | 0.49      | 0.5       |
| Sn | —         | 0.22      | —         |
| Pb | 0.05      | ≤0.1      | ≤0.1      |
| Cr | 0.013     | —         | 0.21      |
| Zn | Remainder | Remainder | Remainder |

Figure 1A:
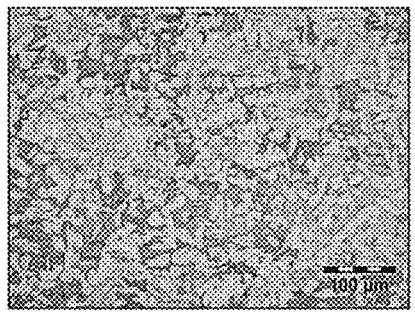
FIG. 1a to 1d shows photomicrographs of an extrusion molded sample in the pressed state made of a first special brass alloy according to the present disclosure.
Figure 1C:
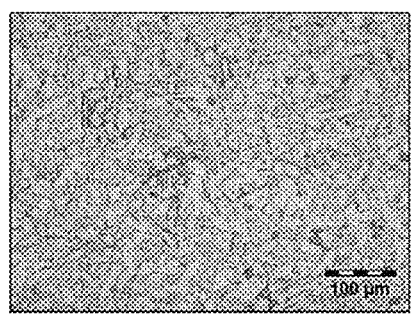
Figure 1B:
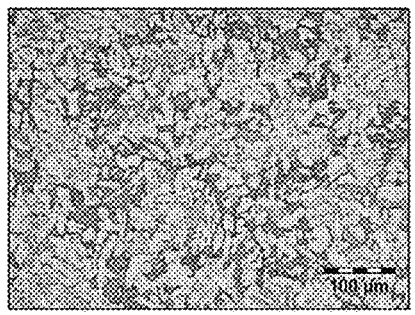
Figure 1D:
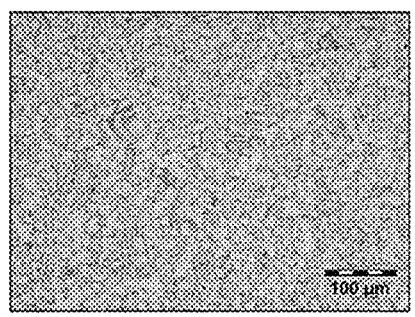

The comparison alloy is the special brass alloy described in EP 3 269 835 B1 in the embodiment example. Sample E1 is a first special brass alloy according to the present disclosure, which represents the Sn-containing variant. FIG. 1 shows photomicrographs of this alloy in the pressed state, removed in longitudinal direction of the pressed connecting piece (FIGS. 1a and 1b) as well as in transverse direction thereto (FIGS. 1c, 1d). FIGS. 1a and 1c are removed from the core, FIGS. 1b and 1d from the radial margin zone. While samples of FIGS. 1a and 1b have been removed in longitudinal direction of the pressed connecting piece, samples of FIGS. 1c and 1d are removed in transverse direction thereto. It is noteworthy that the microstructure is homogeneous both from the core to the margin and also in longitudinal and in transverse direction. These photomicrographs moreover show the α-β structure which is typical for this alloy, in which the α-phase (light grains) interpenetrate the β grains in a lattice-like or strip-like manner.

Figure 2:
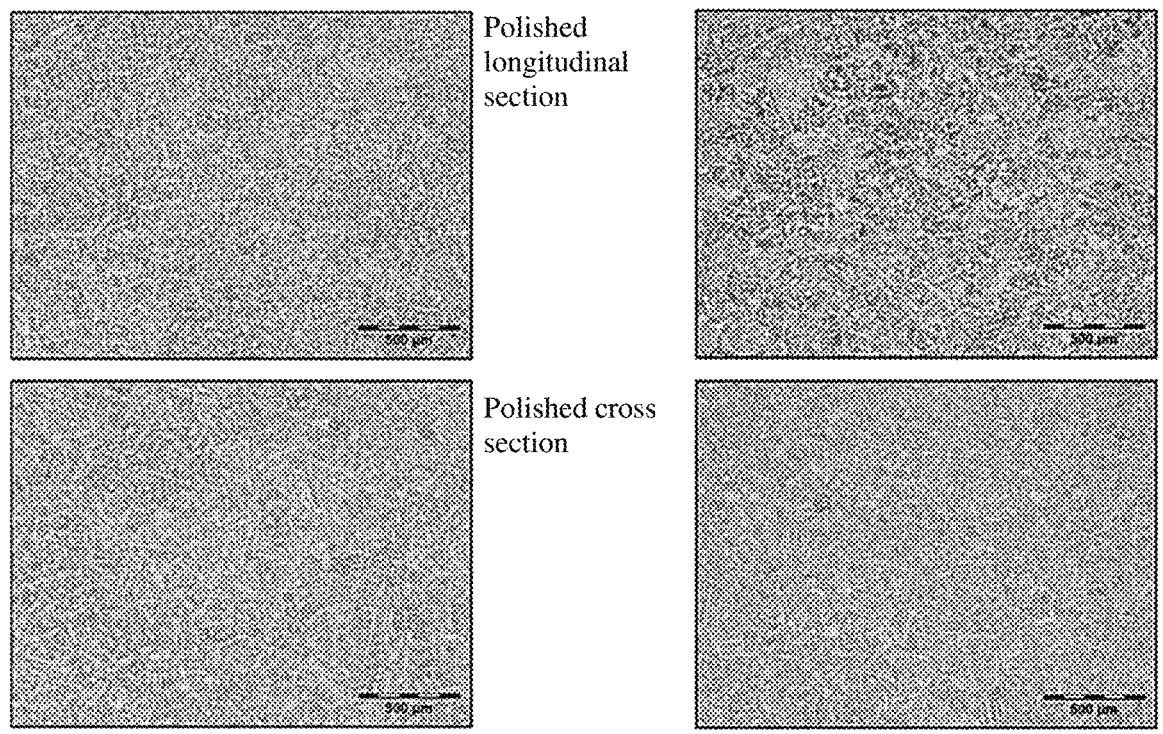
FIG. 2 shows photomicrographs of the sample of the alloy of FIG. 1 in a polished longitudinal and cross section in comparison to photomicrographs of a second special brass alloy according to the present disclosure.

This special microstructure of the pressed connecting piece also becomes clear from the photomicrographs of FIG. 2, which are shown with slight magnification. In this figure, sample E1 is shown on the left and sample E2 is shown on the right with its structure. Sample E2 is a second special brass alloy according to the present disclosure, which represents the Cr-containing variant. The upper image pair in each case shows the structure in longitudinal extension of the pressed connecting piece (of the preform). The lower image pair of FIG. 2 shows the structure in transverse direction. From these photomicrographs as well, the interestingly highly homogeneous structural formation in longitudinal and in transverse direction of samples E1, E2 can be seen. In these photomicrographs also, the α-phase is the lighter component.

FIGS. 3 and 4 show in each case juxtaposed photomicrographs of sample E1 juxtaposed with a photomicrograph of sample V (FIG. 3) and the second sample E2 juxtaposed with a photomicrograph of the sample of comparison alloy V (FIG. 4). These juxtapositions clarify the structural formation of the special brass alloy according to the present disclosure which is significantly different in comparison to the comparison alloy. While the comparison alloy of the "pressed connecting piece" in the processing state exclusively exhibits β-phase, in the alloys according to the present disclosure the β-phase interpenetrated by the α-phase can be seen, wherein the grains of the α-phase extend beyond the grain boundaries of adjoining β-phase grains.

The semi-finished products initially formed from the special brass alloy according to the present disclosure, for example, in the form of extrusion molded connecting pieces, have a proportion of α-phase of approximately 35 to 55%, in particular between approximately 40% and approximately 50%. The α-phase proportion in samples E1 and E2 in each case is approximately 45%. The β-phase forms the remainder. The proportion of intermetallic phases is approximately 3%.

In the special brass alloys according to the present disclosure, the above-described alloy-dependent structural formation is used not only for the discussed thermal and mechanical purposes. Instead, this structural formation with the homogeneous distribution of the α-phase and of the β-phase is suitable for enabling the adjustment of the proportion of the α-phase as a function of the requirements placed on the finished product. This can be carried out by a heat treatment (annealing). If the semi-finished product is subjected to annealing at lower temperature but for a longer treatment duration, the proportion of α-phase is reduced. In order to achieve this, the semi-finished product is treated at temperatures between 260° C. and 300° C. for 4 h to 6 h, in particular at approximately 280° C. for 5 h. By performing the heat treatment with these parameters, the proportion of the α-phase can be reduced to 30% and less.

However, if the heat treatment is carried out at higher temperature for a shorter time, the proportion of the α-phase with respect to the proportion in the pressed connecting piece is increased. This heat treatment is carried out at temperatures between 430° C. and 470° C. for 2.5 h to 4 h, in particular at a temperature of approximately 450° C. for 3 h. The proportion of α-phase can then be increased to 65% and more.

A lowering of the proportion of α-phase leads to a certain increase of the proportion of intermetallic phases, which can then proportionally comprise in such annealed products a proportion of 4.5% to 5.5%.

Figure 7:
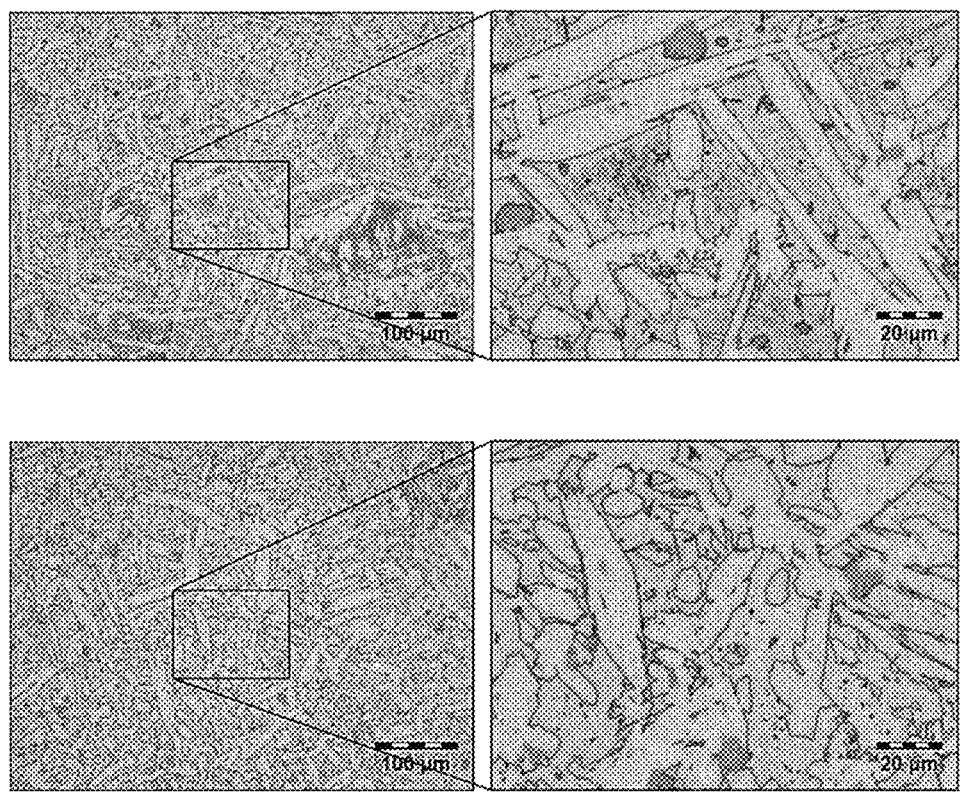
FIG. 7 shows microstructure images of a holding segment formed by forging from the first special brass alloy, after the forging.

The special brass alloy according to the present disclosure is particularly suitable, and the homogeneous extrusion molding structure also contributes to this, for forming pressed connecting piece segments by forging. FIG. 7 shows a forged holding segment from sample E1. The forging is carried out at 700° C. Even after the forging, as can be seen in the microstructure images of FIG. 7, the original structural formation can in principle still be seen and thus has remained preserved.

Figure 8:
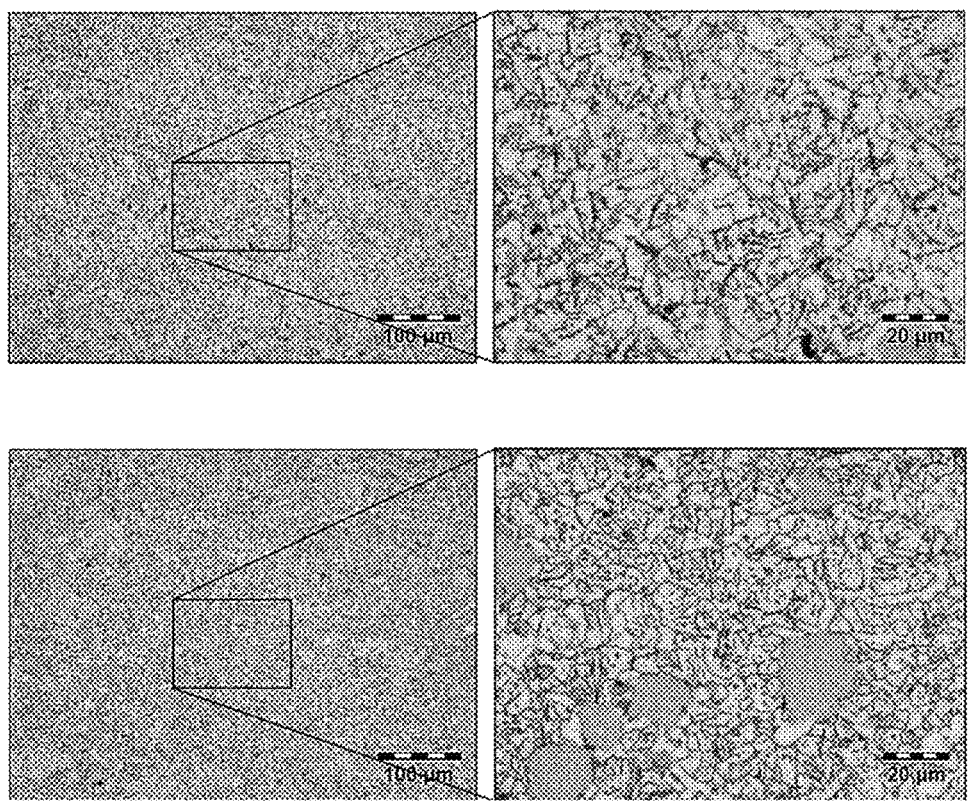
FIG. 8 shows microstructure images of a holding segment formed by forging from the first special brass alloy, after a heat treatment (annealing) downstream of the forging.

FIG. 8 shows the holding segment after a heat treatment has been carried out at 280° C. for 5 h. The heat treatment has contributed to a further homogenization of the structure. In this heat treatment, the proportion of α-phase of approximately 40% after the forging was reduced by the heat treatment to approximately 29%. In addition, the hardness was increased from approximately 140 HB [HBW 2.5/62.5] to approximately 148 HB.

Figure 9:
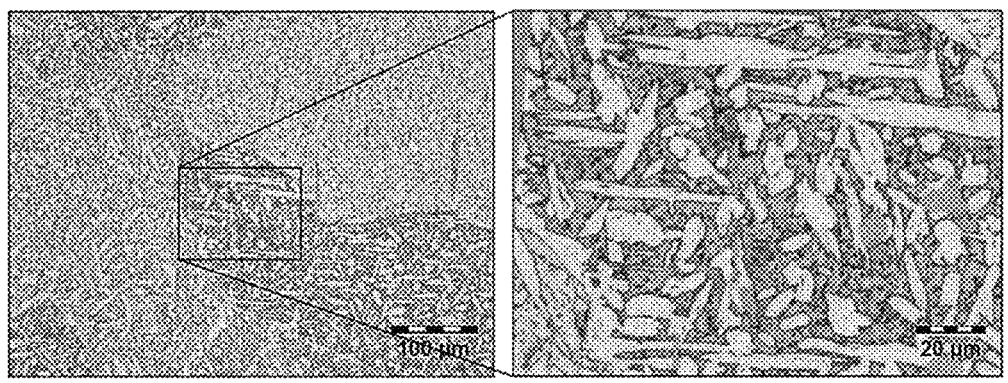
FIG. 9 shows microstructure images of a sliding shoe formed by forging from the first special brass alloy, after the forging.
Figure 10:
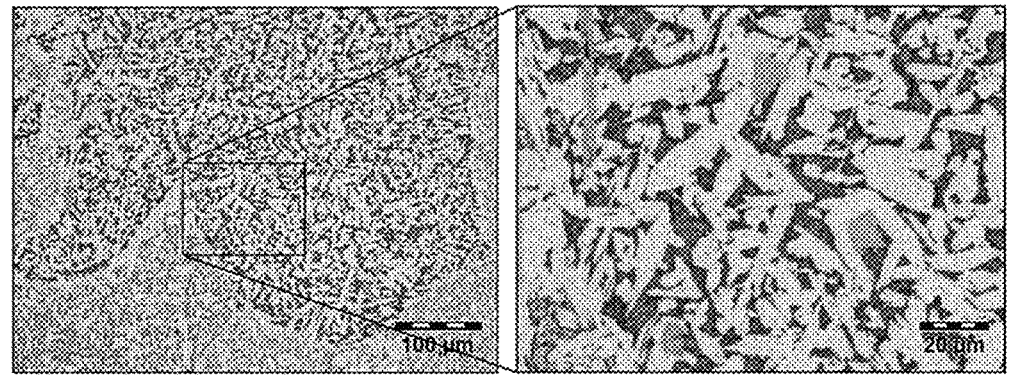
FIG. 10 shows microstructure images of a sliding shoe formed by forging from the first special brass alloy, after a heat treatment (annealing) downstream of the forging.

From sample E1, by forging, a sliding shoe was also produced. FIG. 9 shows the structure after the forging step which was carried out at 710° C. The microstructure set in the pressed connecting piece also remains preserved in principle in this sample in spite of the forging. The forged sliding shoe was subsequently heat treated at 450° C. for 3 h. FIG. 10 shows that the proportion of α-phase has been increased by the annealing step and namely from approximately 50% after the forging, which corresponds to the α-phase proportion in the pressed connecting piece, to approximately 68%. The hardness HB was only slightly raised by the annealing in comparison to the hardness after the forging, and namely from 155 HB [HBW 2.5/62.5] to 159 HB.

In sample V of the comparison alloy, the matrix of the pressed connecting piece contained a proportion of α-phase of <1%.

In the special brass alloy according to the present disclosure, it is interesting that, in comparison to sample V of the comparison alloy, it has an electrical conductivity lower by slightly more than 10%. While the electrical conductivity is 10.4 to 10.7 MS/m in the comparison alloy, it is only 8.8 MS/m in alloy E1. This improves the corrosion resistance of this special brass alloy.

The mechanical characteristics of samples E1 and E2 can be obtained from the following table:

|    | Tensile strength Rm [N/mm$^2$] | Elongation at break A$_5$ [%] | 0.2% elasticity limit R$_{p0.2}$ [N/mm$^2$] |
|----|---|---|---|
| E1 | 550 | 18 | 250 |
| E2 | 545 | 21 | 243 |

The invention claimed is:

1. A special brass alloy product having a composition consisting of:
   62.5 to 65% by weight Cu,
   2.0 to 2.4% by weight Mn,
   0.7 to 0.9% by weight Ni,
   1.9 to 2.3% by weight Al,
   0.35 to 0.65% by weight Si,
   0.3 to 0.6% by weight Fe,
   0.18 to 0.4% total by weight Sn and/or Cr,
   ≤0.1% by weight Pb,
   the remainder consisting of Zn and inevitable impurities;
   wherein the special brass alloy product is a hot forged part, wherein the special brass alloy product has an α-β mixed crystal matrix with an α-phase and a β-phase, wherein the α-β mixed crystal matrix has a proportion of α-phase of 35-55% and a proportion of intermetallic phases of 2-5%, and wherein the α-phase is enclosed in the β-phase or the α-phase penetrates the β-phase providing a grain network being interpenetrated by the α-phase.

2. The special brass alloy product of claim 1, wherein the special brass alloy product contains 63 to 64% by weight Cu.

3. The special brass alloy product of claim 1, wherein the special brass alloy product contains 2.1 to 2.2% by weight Mn.

4. The special brass alloy product of claim 1, wherein the special brass alloy product contains 2.0 to 2.2% by weight Al.

5. The special brass alloy product of claim 1, wherein the special brass alloy product contains 0.4 to 0.5% by weight Fe.

6. The special brass alloy product of claim 1, wherein the special brass alloy product contains 0.2 to 0.3% by weight Sn or 0.2 to 0.27% by weight Cr.

7. The special brass alloy product of claim 1, wherein the special brass alloy product is a sliding shoe or a bearing bushing.

8. The special brass alloy product of claim 1, wherein the special brass alloy product contains
   63 to 64% by weight Cu,
   2.1 to 2.2% by weight Mn,
   2.0 to 2.2% by weight Al, and
   0.4 to 0.5% by weight Fe.

9. The special brass alloy product of claim 8, wherein the special brass alloy product contains 0.2 to 0.3% by weight Sn or 0.2 to 0.27% by weight Cr.

10. The special brass alloy product of claim 1, wherein the proportion of α-phase is 40-50% of the α-β mixed crystal matrix.

11. The special brass alloy product of claim 1, wherein the special brass alloy product contains intermetallic compounds of round or globular habit embedded in the α-β mixed crystal matrix.

* * * * *